July 17, 1956 — D. C. KOEHLER — 2,754,680
TEST FIXTURE FOR WELDED RELAY CONTACTS
Filed Jan. 20, 1954 — 2 Sheets-Sheet 1
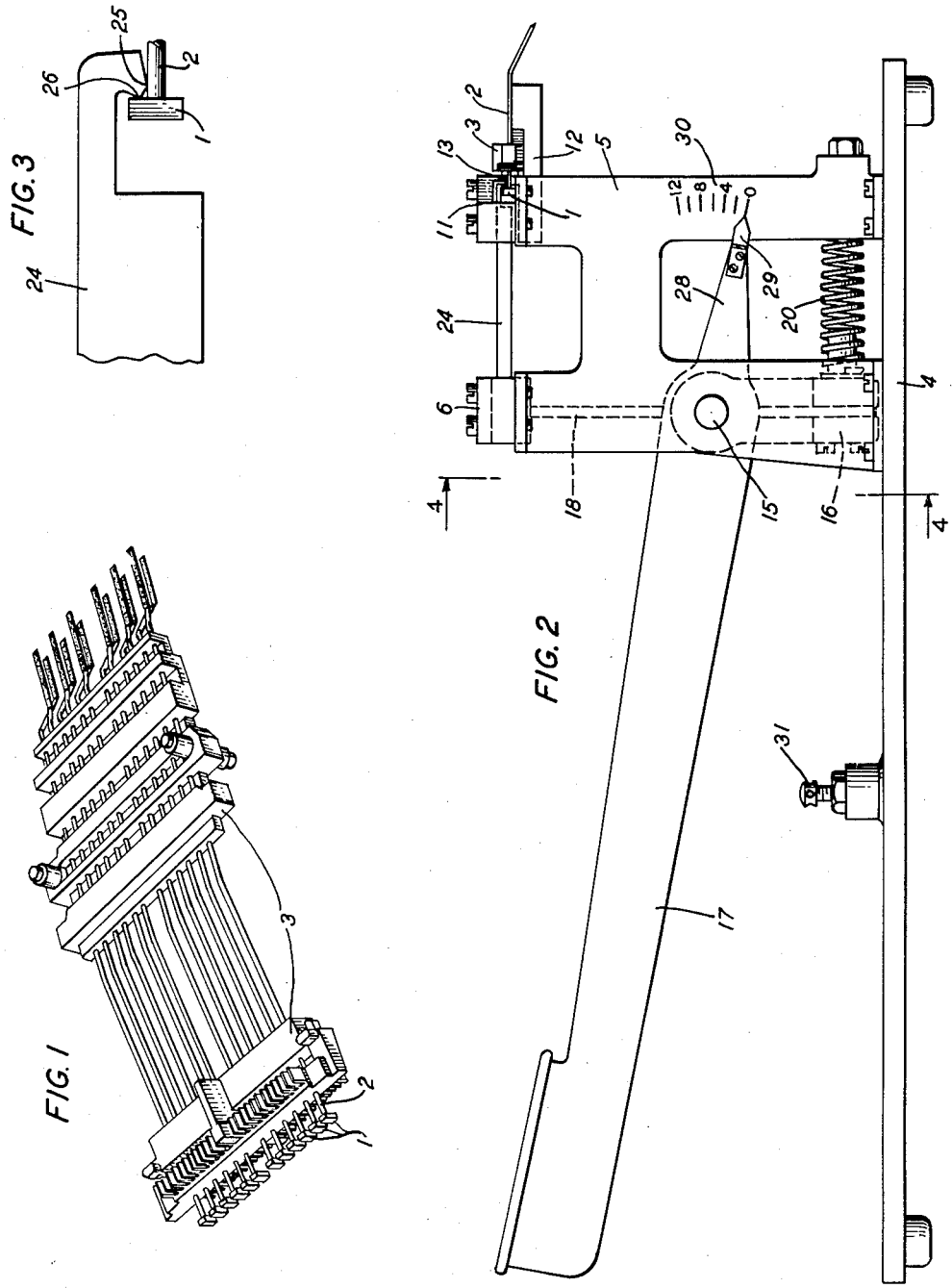
INVENTOR
D. C. KOEHLER
BY
ATTORNEY July 17, 1956 D. C. KOEHLER 2,754,680
TEST FIXTURE FOR WELDED RELAY CONTACTS
Filed Jan. 20, 1954 2 Sheets-Sheet 2

INVENTOR
D. C. KOEHLER
BY J. F. McEneany
ATTORNEY

United States Patent Office 2,754,680

Patented July 17, 1956

2,754,680

TEST FIXTURE FOR WELDED RELAY CONTACTS

Donald C. Koehler, Livingston, N. J., assignor to Bell Telephone Laboratories, Incorporated, New York, N. Y., a corporation of New York Application January 20, 1954, Serial No. 405,167

5 Claims. (Cl. 73—95)

This invention relates to a test fixture for relay contact assemblies and more particularly to a mechanism for testing the strength of the weld between each of the contacts and their individual wire supports in a multiple contact assembly of a relay.

It is the object of this invention to provide a mechanism by means of which a predetermined tension and bending stress may be applied both rapidly and simultaneously to all of the contact welds of a multiple contact assembly of a relay.

In the manufacture of wire spring relays, the contacts are butt-welded to the ends of the stationary wire supports. Difficulty has been experienced in obtaining sufficient control of the welding process to insure that the strength of each weld joining a contact and its associated wire support is sufficient to substantially eliminate any possibility that it will break under operating conditions over the extended period of operation expected of such relays.

There has, therefore, been a need for means for testing the weld strength of all all contact welds of a relay multiple contact assembly. It is highly desirable that such means be capable of rapidly applying the same predetermined testing force simultaneously to all contact welds of a multiple contact assembly.

In accordance with this invention, applicant provides a test fixture comprising means for supporting a relay multiple contact assembly in position such that each contact is engaged by an associated horizontally disposed tension bar provided with a contact-engaging end. The contact-engaging end of each tension bar is so shaped that the contact is engaged a predetermined distance from the surface of its wire support. The other end of each tension bar is engaged by a vertically disposed flat spring member. The other end of each of the plurality of spring members is mounted in a pivoted yoke which is rotatable by a manually operable handle in a manner to flex the plurality of springs simultaneously. Flexing of the spring elements produces an equal horizontal force in each tension bar and thereby simultaneously applies a bending and tension stress in the weld area of all the contacts engaged by the tension bars. Adjustable stop means is provided for limiting the movement of the operation handle so that the value of the force to be applied to the tension bars may be predetermined.

The invention will be more clearly understood by reference to the following specification describing the accompanying drawings in which:

Fig. 1 is a perspective view of a multiple contact assembly for a relay;

Fig. 2 is a side elevation of the test fixture in accordance with this invention;

Fig. 3 is an enlarged view of the contact-engaging end of one tension bar, a plurality of which are used in the test fixture of Fig. 2;

Figure 5:
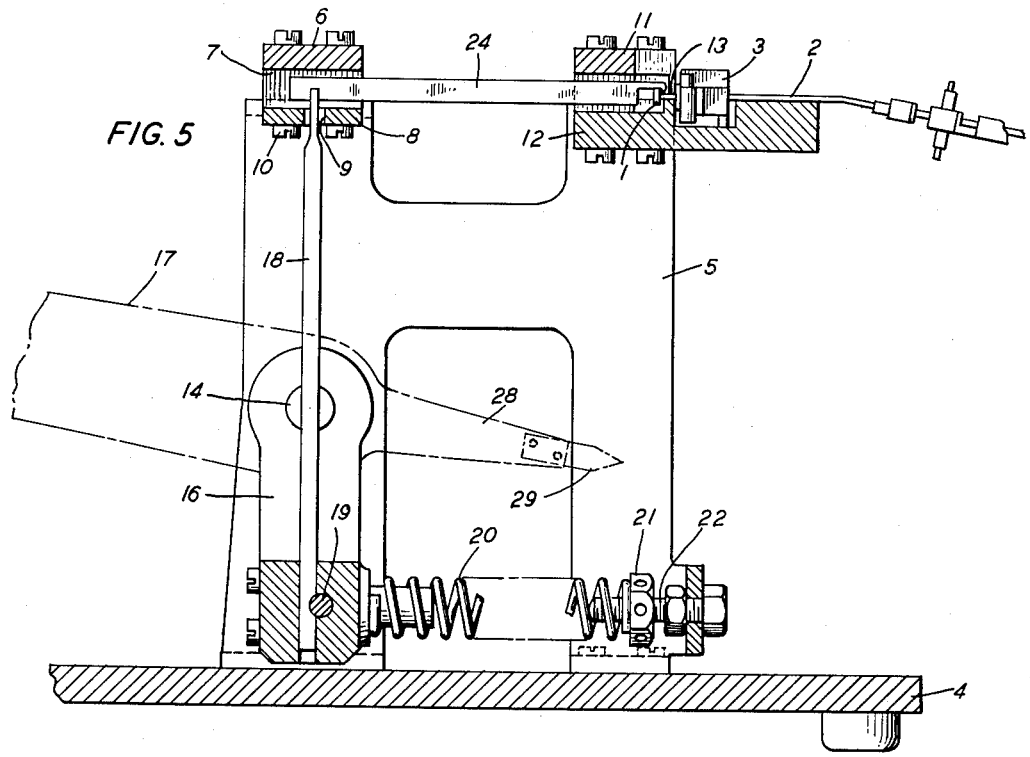
Fig. 5 is a section taken through line 5—5 of Fig. 4.

Referring to Fig. 1 of the drawings, a multiple contact assembly as shown therein comprises a plurality of contacts 1, each of which is butt-welded to an associated wire spring support indicated at 2. The supporting wires 2 are assembled as a unit structure in plastic blocks, as indicated at 3.

In Fig. 2, the fixture provided for simultaneously testing the strength of the welds between all the contacts 1 and associated wire supports 2 comprises a base 4 on which is secured a supporting structure 5 for the operating elements of the test fixture in accordance with this invention. An element 6, provided with a plurality of apertures 7, is secured to the top of the supporting structure 5, as shown particularly in Fig. 4. A cooperating element 8, provided with a slot 9 (Fig. 5), is secured to member 6 by means of machine screws, indicated at 10.

A member 11 and a cooperating member 12, also secured to the top of the supporting element 5, form a supporting means for the wire spring assembly to be tested. The cooperating members 11 and 12 form between them a slot 13, as indicated in Figs. 2 and 5. This slot 13 extends substantially the full width of the fixture and is open at one end to permit insertion of the wire spring assembly to be tested with the wire supports immediately in back of the contacts disposed in the slot, as shown in Figs. 2 and 5.

Figure 4:
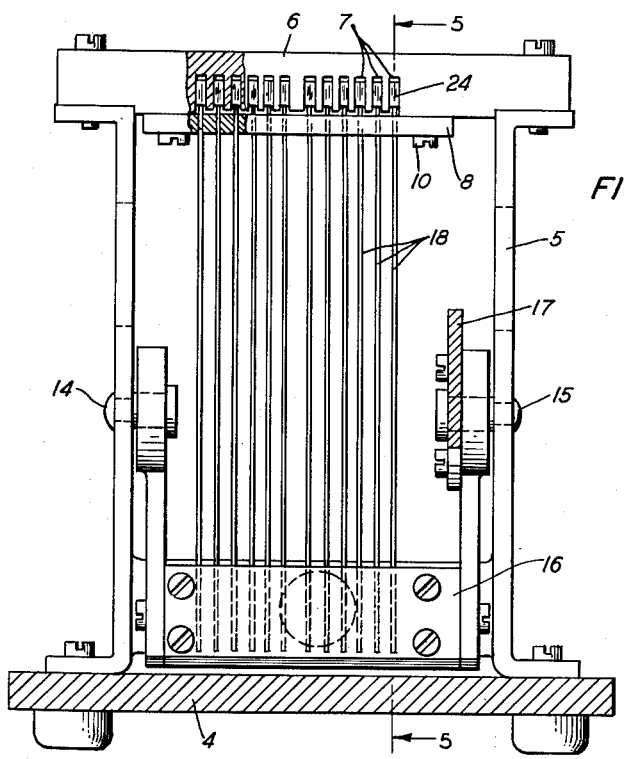
Fig. 4 is a section taken through line 4—4 of Fig. 2.

Referring particularly to Fig. 4, a stud 14 in one side of supporting member 5 and a stud 15 in the opposite side of supporting member 5 provide a pivot bearing for a rotatable yoke member 16. A handle 17, secured to yoke 16, provides means for rotating the yoke 16 about the axis of studs 14 and 15.

As shown particularly in Figs. 4 and 5, the lower end of each of twelve vertically disposed, flat cantilever springs 18, is secured in yoke 16 by means of a pin 19 (Fig. 5). A compression return spring 20 has one end engaging yoke 16 and the other end in engagement with an adjusting nut 21 threaded on a stud 22 secured to support 5. This compression spring 20 provides means for maintaining the yoke 16 and the cantilever springs 18 in a desired substantially vertical position, as shown in the drawings.

The reduced upper end of each of the spring members 18 extends through the slot 9 in member 8 and into a notch in an associated horizontally disposed tension bar 24, which extends into the aperture 7 in member 6. The other end of each of the tension bars 24 is hook-shaped as shown in detail in Fig. 3. The shape of the hooked end of tension bar 24 is such that one edge 25 slidably engages the wire support 2 and a second edge 26 engages the contact 1. The vertical distance between the edges 25 and 26 is accurately determined and is the same for each of the tension bars 24. This insures that each of the contacts 1 is engaged a predetermined distance above the center of its associated wire support to which it is welded. The supporting wires 2 adjacent the contacts 1 may vary slightly in the vertical direction due to warpage of the plastic blocks 3 or variations in straightness of the wires. By using a hooked end to all tension bars as described, the force applied to each contact through the tension bars is applied the same distance from each wire in spite of these variations.

In the operation of the testing fixture, the wire spring assembly to be tested is inserted from one side, with the sections of supporting wire 2 just behind the contacts resting in slot 13 formed by the two supporting members 11 and 12. In this position the contact-engaging end of each of the tension bars 24 rests on an associated wire 2 so that the vertical position of the right end of each tension bar is determined by the vertical position of the wires 2. By reason of the action of spring 20, the tension bars 24 are maintained in such position that the hooked ends thereof do not interfere with insertion of the contact end of the assembly into the test fixture.

With the wire spring assembly in the position indicated in the drawings, the handle 17 is depressed downward with the result that the yoke 16 is rotated about its axis against the force of compression spring 20. The twelve cantilever springs 18, being rigidly fastened to yoke 16, are urged to rotate about the axis of the yoke and handle. The upper ends of springs 18 and the tension bars 24 associated therewith are moved a short distance to the left until the contact-engaging edge 26 of each of the tension bars 24 strikes the right-hand surface of each of the contacts 1. Rotation of yoke 16 beyond this point causes the cantilever springs 18 to flex, thereby applying a controlled tension in each tension bar and a resulting bending and tension stress in each contact weld. If the weld between any contact and its associated supporting wire should break as a result of this force, the associated tension bar and cantilever spring are allowed to move a short distance to the left until the tip of the spring strikes the back surface of slot 9, formed in member 8. Upon release of handle 17, the force of the spring 20 will return the handle and yoke to the vertical position as shown in the drawings. The wire spring assembly may then be removed and replaced by another for test.

The extension 28 of handle 17 is provided with a pointer 29 and a scale of pounds 30 is inscribed on member 5 in the path of movement of pointer 29. The force to be exerted on the contacts by downward movement of the handle 17 may be adjusted prior to operation by movement of the handle and associated index pointer 29 to the desired indication on the scale 30 and the adjustable stop member 31 adjusted vertically until it engages the underside of the handle 17.

By means of the test fixture in accordance with this invention, a controlled force may be applied rapidly and simultaneously to all of the twelve contacts of a wire spring assembly. This force is applied in a direction parallel to the length of the contact supporting wires and at a controlled distance from the center of each wire. The force applied is a combination of tension and bending stress in the weld area, the proportion of each denpending on the distance between the point of application of the force on the contact and the center of the contact supporting wire. In the test fixture disclosed in the drawings this distance has been chosen as .03 of an inch.

The feature of applying a combined tension and bending stress to the weld area has several advantages as compared with a simple tension test without bending. For example, the construction of a test fixture in accordance with this invention using a single hook engaging only one side of the contact is much simpler than a fixture construction which would be required to obtain a pure tension test wherein it would be necessary to engage the two sides of a contact at exactly equal distances from the center of the supporting wire or the forces apportioned to compensate for the inequalities in distances. It can be shown that in the test fixture in accordance with this invention, a variation of .002 inch in the point of application of the force on the contact results in a variation in maximum stress of only 6 percent whereas a similar variation in the point of application of the force in a test fixture applying a pure tension, as described above, will result in a variation in maximum stress of approximately 40 per cent.

Applicant, therefore, provides a novel and compact test fixture by means of which a known tension and bending stress can be applied both rapidly and simultaneously to all of the contact welds of a multiple contact assembly of a relay.

What is claimed is:

1. In a mechanism for testing the weld strength of contacts welded to wire supports in a relay contact assembly wherein each contact is welded to the end of a wire support having a cross sectional area smaller than the area of the side of the contact welded thereto, a support for holding a relay contact assembly, a plurality of contact engaging means corresponding in number to the contacts to be tested, each said contact engaging means being adapted to engage its associated contact a predetermined distance from the contact supporting wire on the wire supporting side of said contact to produce when operated a tension and bending stress in the weld area of its associated contact, and a single means connected to all of said plurality of contact engaging means, said single means being operable to produce simultaneous operation of all said contact engaging means.

2. In a fixture for testing the strength of a weld between a contact and its wire support in a relay contact assembly wherein said contact is welded to the end of a wire support having a cross sectional area smaller than the area of the side of the contact welded thereto, means for supporting said relay contact assembly, means engaging said contact on the wire support side thereof, said engaging means comprising a bar provided at one end thereof with two vertically separated projections, the lower one of said projections engaging the upper surface of said wire support and the upper one of said projections engaging a surface of said contact, and means connected to said bar, said last-mentioned means being operable to produce movement of said bar along the axis of said wire support in the direction of said contact with a force sufficient to produce a tension and bending stress in the weld area under test.

3. A fixture for simultaneously testing the strength of the welds between all contacts and their associated wire supports in a relay contact assembly wherein each contact is welded to the end of a wire support having a cross sectional area smaller than the area of the side of the contact welded thereto, comprising means for holding a relay contact assembly, a plurality of contact engaging means corresponding in number to the contacts to be tested, each said contact engaging means being provided with a first projection engaging the surface of said contact and a second projection vertically spaced a predetermined distance below said first projection and adapted to engage a surface of said wire support, and a single means connected to all said plurality of contact engaging means, said single means being operable to produce simultaneous movement of all said contact engaging means into engagement with their associated contacts to apply a force simultaneously on all said contacts at the same distance from the center of all the weld areas under test.

4. In a mechanism for testing the weld strength of contacts welded to wire supports in a relay contact assembly wherein each contact is welded to the end of a wire support having a cross sectional area smaller than the area of the side of the contact welded thereto, the combination with a base and a support mounted on said base for positioning the relay contact assembly, of a plurality of tension bars corresponding in number to the contacts to be tested, each said tension bar being provided with means at one end thereof for engaging its associated contact a predetermined distance from the supporting wire to which it is welded, flexible means individual to each tension bar and engaging its associated tension bar at the other end thereof, and a single means connected to all said individual flexible means, said single means being operable to produce simultaneous flexing of all said flexible means with resulting movement of all said tension bars in a direction to engage and produce a predetermined tension and bending stress in the weld area of all said contacts simultaneously.

5. In a fixture for simultaneously testing the strength of all welds between the contacts and wire supports in a relay contact assembly wherein each contact is welded to the end of a wire support having a cross sectional area smaller than the area of the side of the contact welded thereto, the combination with means for supporting said relay contact assembly with the wire supports disposed horizontally, of a plurality of horizontally disposed tension bars corresponding in number to the contacts to be tested, each said tension bar being provided with means at one end thereof for engaging the associated contact on the wire support side thereof, a plurality of vertically disposed flexible elements corresponding in number to the number of said tension bars, each said flexible element having the upper end thereof in engagement with the free end of its associated tension bar, a yoke rotatable about a horizontally disposed axis normal to the longest dimension of said tension bars, means securing the lower end of each of said flexible elements in said yoke, and manually operable means producing rotation of said yoke to produce a flexing of said flexible members in a manner to produce movement of said tension bars into engagement with their associated contacts whereby a tension and bending stress is applied simultaneously to all contacts of said relay contact assembly.

References Cited in the file of this patent

UNITED STATES PATENTS

| | | |
|---|---|---|
| 2,018,219 | Morgan et al. | Oct. 22, 1935 |
| 2,261,783 | Stull | Nov. 4, 1941 |
| 2,292,235 | McCarthy | Aug. 4, 1942 |
| 2,535,988 | Sakirsky | Dec. 26, 1950 |
| 2,593,269 | Clifford et al. | Apr. 15, 1952 |